US010303331B2

(12) United States Patent
Howett (10) Patent No.: US 10,303,331 B2
(45) Date of Patent: May 28, 2019

(54) LIVE MOBILE APPLICATION VISUAL EDITOR DEMO

(71) Applicant: Apptimize, Inc., Menlo Park, CA (US)

(72) Inventor: Dustin L. Howett, Seattle, WA (US)

(73) Assignee: Apptimize, Inc., San Francisco, CA (US)

( * ) Notice: Subject to any disclaimer, the term of this patent is extended or adjusted under 35 U.S.C. 154(b) by 46 days.

(21) Appl. No.: 15/228,308

(22) Filed: Aug. 4, 2016

(65) Prior Publication Data

US 2017/0039037 A1 Feb. 9, 2017

Related U.S. Application Data

(60) Provisional application No. 62/200,769, filed on Aug. 4, 2015.

(51) Int. Cl.
*G06F 8/38* (2018.01)
*G06F 8/34* (2018.01)
*G06F 3/0482* (2013.01)
*G06F 9/451* (2018.01)
*G06F 9/44* (2018.01)

(52) U.S. Cl.
CPC .......... *G06F 3/0482* (2013.01); *G06F 9/4445* (2013.01); *G06F 9/452* (2018.02)

(58) Field of Classification Search
CPC ...... G06F 8/38; G06F 3/0482; G06F 17/3089; G06F 8/34; G06F 17/212; G06F 3/04842; G06F 3/04845; G06F 2221/033; G06F 11/3438; G06F 17/211
See application file for complete search history.

(56) References Cited

U.S. PATENT DOCUMENTS

| 8,078,448 | B1* | 12/2011 | Wohlberg | G06F 11/3684 |
| | | | | 703/23 |
| 2004/0027378 | A1* | 2/2004 | Hays | G06F 8/38 |
| | | | | 715/763 |
| 2011/0154305 | A1* | 6/2011 | LeRoux | G06F 8/71 |
| | | | | 717/140 |
| 2013/0205277 | A1* | 8/2013 | Seven | G06F 8/38 |
| | | | | 717/121 |

(Continued)

OTHER PUBLICATIONS

Anthony I. Wasserman; Software Engineering Issues for Mobile Application Development; ACM; pp. 397-400; <https://dl.acm.org/citation.cfm?id=1882443>; retrieved on Dec. 10, 2018 (Year: 2010).*

(Continued)

*Primary Examiner* — Geoffrey R St Leger
*Assistant Examiner* — Cuong V Luu (57) ABSTRACT

Techniques to facilitate demonstrating changes to mobile applications are disclosed herein. In at least one implementation, an instance of a virtual mobile device is executed on a computing system, wherein the virtual mobile device comprises at least one mobile application. Instructions are received to change at least one visual element of the at least one mobile application. The instructions are processed to generate a screenshot of the change to the at least one visual element. The screenshot of the change is transferred for delivery to a remote computing system, wherein the remote computing system displays the screenshot of the change.

20 Claims, 9 Drawing Sheets

(56) References Cited

U.S. PATENT DOCUMENTS

| | | | |
|---|---|---|---|
| 2013/0219307 A1* | 8/2013 | Raber | G06F 3/0484 |
| | | | 715/763 |
| 2015/0160931 A1* | 6/2015 | Glazer | G06F 9/452 |
| | | | 717/109 |
| 2016/0149987 A1* | 5/2016 | Thompson | H04L 67/02 |
| | | | 709/217 |
| 2016/0378439 A1* | 12/2016 | Straub | G06F 8/34 |
| | | | 717/107 |

OTHER PUBLICATIONS

Mark Carson et al.; NIST Net A Linux-based Network Emulation Tool; ACM; pp. 111-126; <https://dl.acm.org/citation.cfm?id=957007>; retrieved on Dec. 10, 2018 (Year: 2003).*

John M. Carroll et al.; Interface Metaphors and User Interface Design; Elsevier; pp. 67-85; <https://www.sciencedirect.com/science/article/pii/B9780444705365500087>; retrieved on Dec. 10, 2018 (Year: 1988).*

* cited by examiner

LIVE MOBILE APPLICATION VISUAL EDITOR DEMO

RELATED APPLICATIONS

This application claims the benefit of, and priority to, U.S. Provisional Patent Application No. 62/200,769, entitled "LIVE MOBILE APPLICATION VISUAL EDITOR DEMO", filed Aug. 4, 2015, which is hereby incorporated by reference in its entirety for all purposes.

TECHNICAL BACKGROUND

Modern computing systems such as smartphones, tablets, and other mobile devices enable users to install and run various applications. Some applications may be configured with analytics engines that are called during the operation of the device. For example, the main program code of a mobile application may be configured to send function calls to an analytics module to collect and process analytics data about how the device is operated.

In the fields of computer hardware and software technology, it is possible in various runtime environments to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface, for example.

Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function.

OVERVIEW

Techniques to facilitate demonstrating changes to mobile applications are disclosed herein. In at least one implementation, an instance of a virtual mobile device is executed on a computing system, wherein the virtual mobile device comprises at least one mobile application. Instructions to change at least one visual element of the at least one mobile application are received and processed to generate a screenshot of the change to the at least one visual element. The screenshot of the change is transferred for delivery to a remote computing system, wherein the remote computing system displays the screenshot of the change.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Designers of mobile applications often desire to make changes and updates to visual elements and other aspects of the user interface. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code.

To demonstrate this functionality to an application designer who may be interested in utilizing this service, an instance of a virtual mobile device can be executed on a server computing system. The instance of the virtual mobile device is capable of receiving instructions to change one or more visual elements of a mobile application. Screenshots of the changes to the visual elements are then generated and transferred to a remote computing system for display. For example, the remote computing system could be running a web browser with a JavaScript mockup of a mobile device in which the screenshot changes to the visual elements of the mobile application can be displayed. In this manner, the application designer can experience a live demonstration of how visual elements of a mobile application can be edited and updated in real time.

Figure 1:
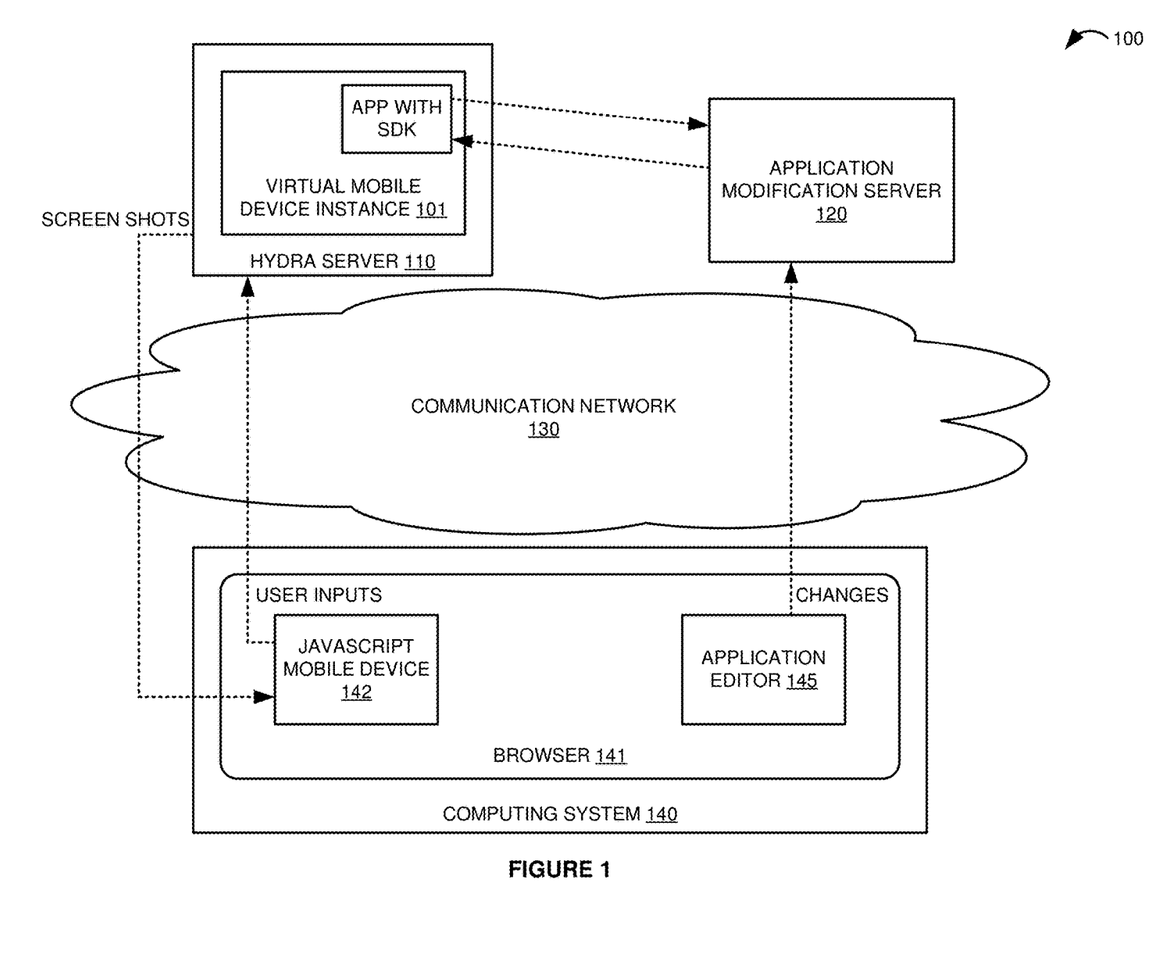
FIG. 1 is a block diagram that illustrates a communication system.
Figure 2:
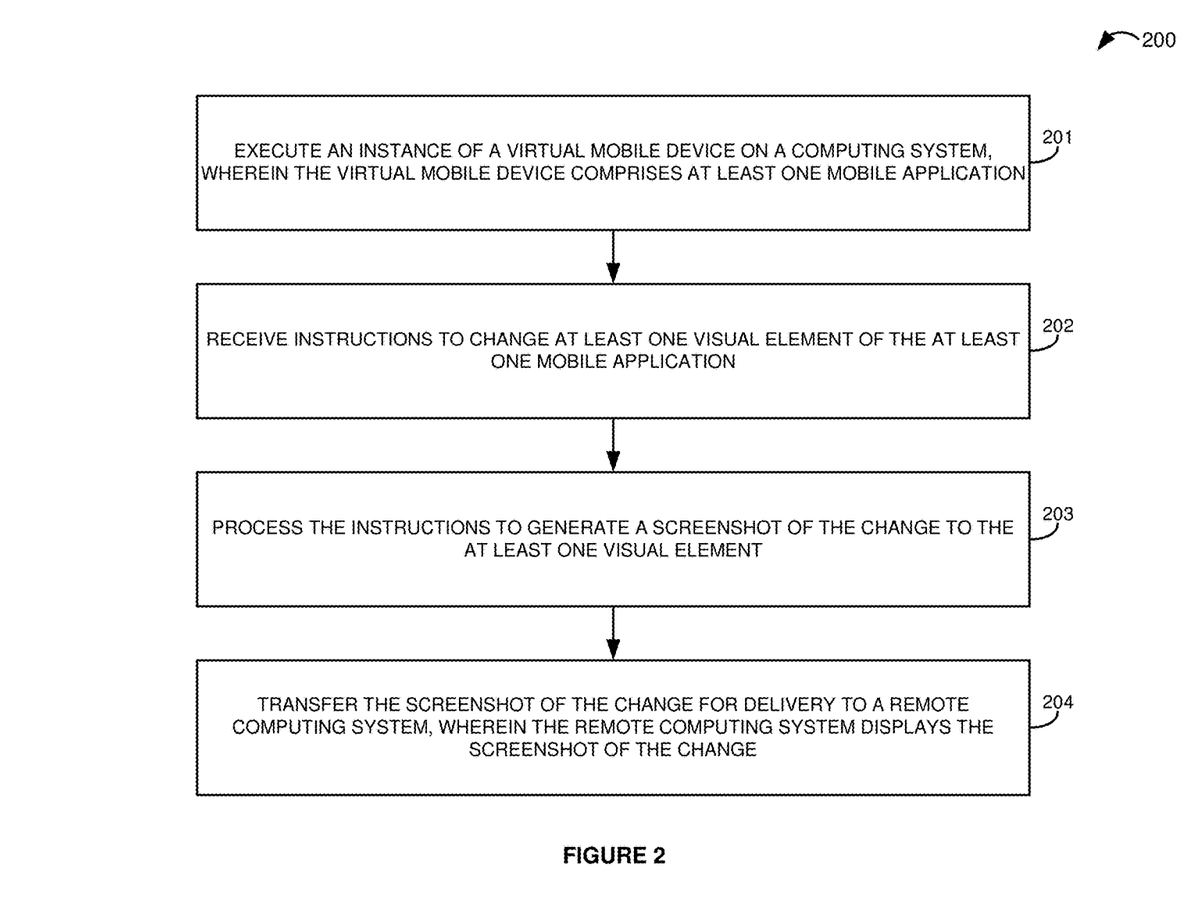
FIG. 2 is a flow diagram that illustrates an operation of the communication system.
Figure 4:
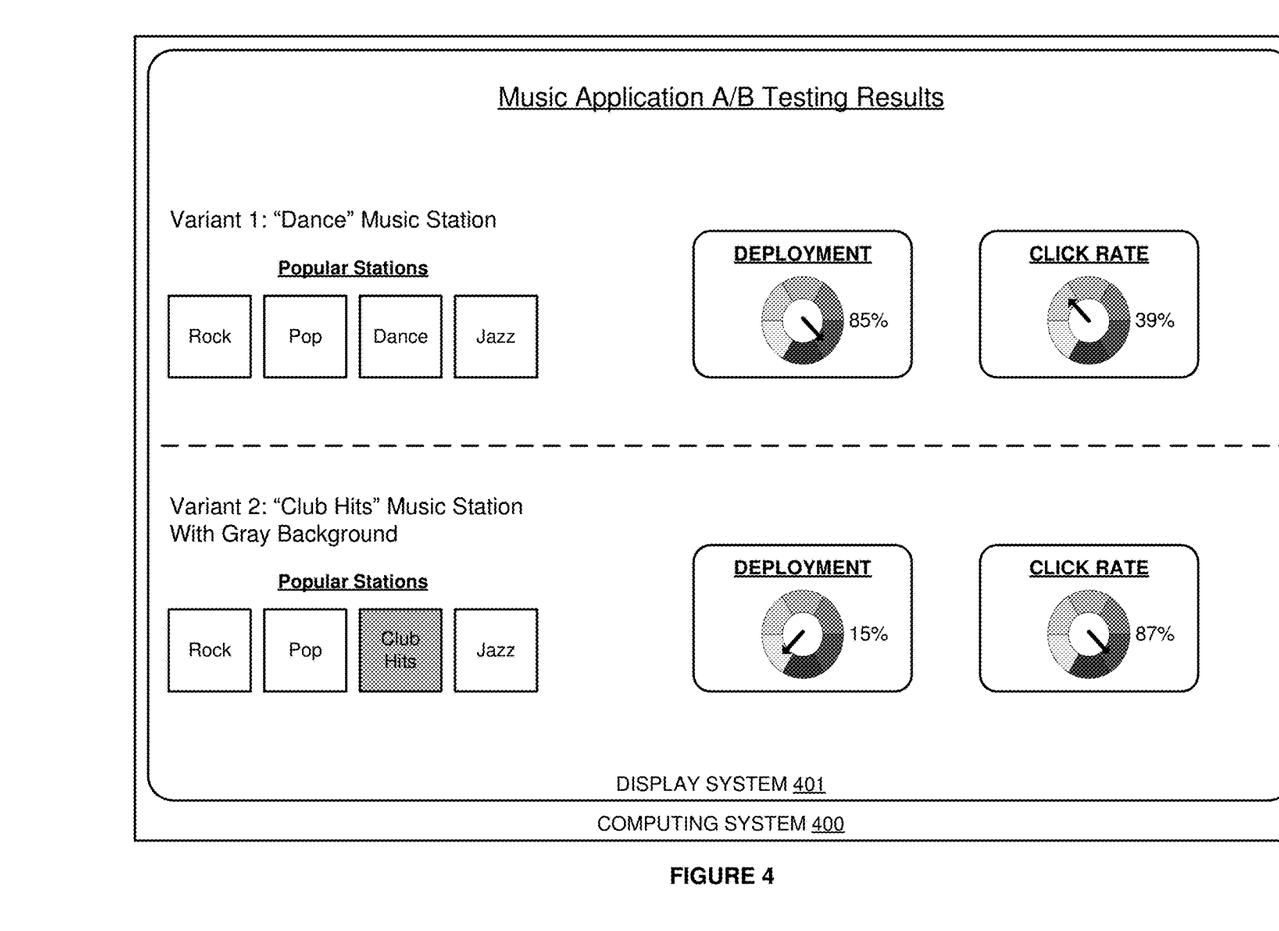
FIG. 4 is a graphical user interface (GUI) diagram that illustrates an operation of a computing system in an exemplary embodiment.
Figure 5:
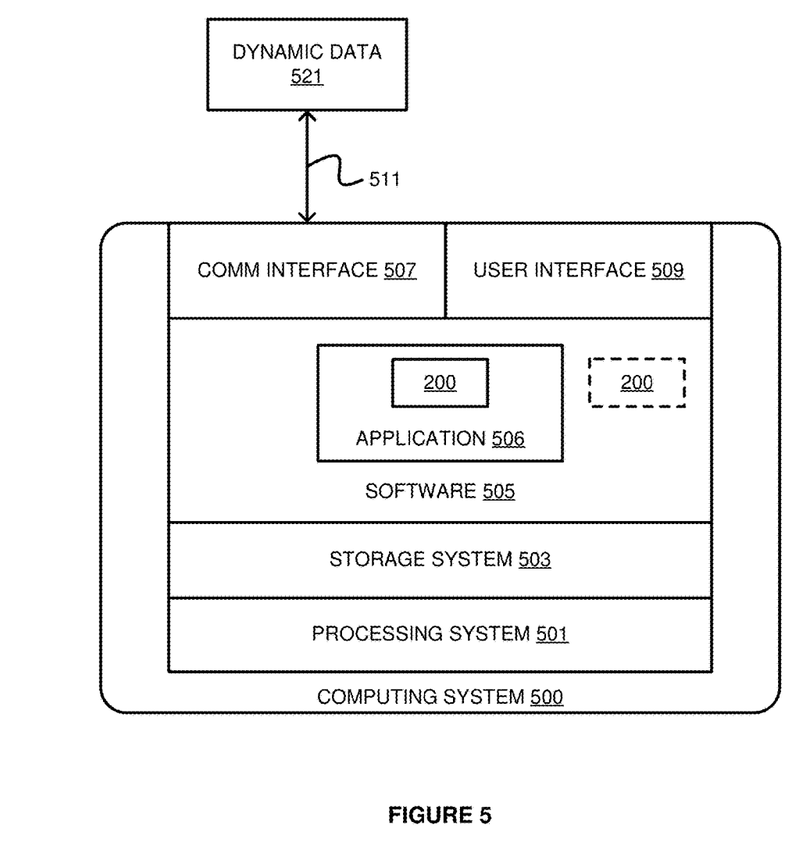
FIG. 5 is a block diagram that illustrates a computing system.

Referring now to the drawings, FIG. 1 illustrates a communication system capable of performing live demonstrations of visual edits to a mobile application. FIG. 2 is a flow diagram that illustrates a demonstration process that may be performed by the communication system. FIGS. 3A-3E illustrate a series of graphical user interfaces involving an application editor on a computing system. FIG. 4 is a graphical user interface (GUI) diagram that illustrates a demonstration of A/B testing results for different variants in an exemplary embodiment. FIG. 5 illustrates an exemplary computing system that may be used to perform any of the demonstration processes and operational scenarios described herein.

Turning now to FIG. 1, a block diagram of communication system 100 is illustrated. Communication system 100 includes hydra server 110, application modification server 120, communication network 130, and computing system 140. Hydra server 110 includes virtual mobile device instance 101. Virtual mobile device instance 101 includes an application with a software development kit (SDK) installed therein. Computing system 140 includes browser 141 which includes JavaScript mobile device 142 and application editor 145. Note that although JavaScript is used to describe the JavaScript mobile device 142, any suitable programming language could be used to implement the software-based mobile device 142 in browser 141. In some implementations, application editor 145 could be executed remotely outside of computing system 140, including within servers 110 and/or 120.

In operation, a user operates computing system 140 to launch browser 141 to interact with a live demonstration of edits to visual elements of a virtual mobile application displayed on JavaScript mobile device 142 within browser 141. When the user loads the JavaScript mobile device 142 on browser 141, a mobile device emulator running on hydra server 110 instantiates virtual mobile device instance 101. Hydra server 110 can manage multiple instances of emulated virtual mobile devices and handles expiration of these emulated devices to ensure resource limits are not exceeded. Each virtual mobile device instance 101 running on hydra server 101 includes at least one mobile application with a specialized software development kit (SDK) installed into the application for handling modifications to visual elements. Typically, when a virtual mobile device instance 101 is created by hydra server 110, a mobile device image file is applied to the virtual device instance 101 which includes one or more mobile applications with the SDK pre-installed into each application.

Virtual mobile device instance 101 then contacts application modification server 120 and acts like a real, physical mobile device. Application modification server 120 creates a temporary user account for virtual mobile device instance 101 and sends a token to virtual mobile device instance 101, referred to herein as an application key. The application key comprises a unique key linked to the temporary user account and issued on a per-application basis. Virtual mobile device instance 101 adds an application modification property in the system property store which is checked at runtime to inform virtual mobile device instance 101 that instructions for modifications to visual elements of the application should be processed and displayed if present. Virtual mobile device instance 101 is then linked to the application editor window 145 remotely over communication network 130.

The user interacting with the live demonstration then provides user inputs into the JavaScript mobile device 142 and the application editor 145 using an input device on computing system 140, such as a mouse, keyboard, touchscreen, and the like. In particular, the user can navigate through the various screens and features of the mobile application by providing user inputs into the JavaScript mobile device 142, which are sent over communication network 130 to hydra server 110 for processing. Updated screenshots that are generated by virtual mobile device instance 101 in response to the user inputs are then sent from hydra server 110 back to browser 141 on computing system 140 for display on JavaScript mobile device 142. In this manner, the user can interact with the JavaScript mobile device 142 appearing in browser 141 and load and navigate through various mobile applications as if JavaScript mobile device 142 were a real mobile device.

The user can also utilize application editor 145 to make changes to visual elements of applications appearing on JavaScript mobile device 142. Typically, the screenshots of JavaScript mobile device 142 are mirrored on application editor 145 in real time to provide the user the ability to select visual elements of an application presently displayed on JavaScript mobile device 142. The application editor 145 receives the screenshots from the application running on virtual mobile device instance 101 via hydra server 110, along with the locations and visual properties of the visual elements appearing on a given application screen. The SDK installed on the application running on the virtual device instance 101 collects this information by analyzing the application to identify handles of buttons and other screen objects, text fields, image placement, background colors, patterns, or images, and any other screen elements. The application editor 145 then provides the user with the ability to select among these visual elements of the application to modify the content, styling, layout, and other visual properties of these elements.

Changes to the visual elements of the application that are provided by the user via the application editor window 145 in browser 141 are sent to the application modification server 120 over communication network 130. The SDK in the application running on virtual mobile device instance 101 contacts the application modification server 120 to exchange information and receive the modification instructions. The SDK then applies these changes to the visual elements of the application and generates updated screenshots which are transferred by hydra server 110 to computing system 140 for display in browser 141 as updates to the display of JavaScript mobile device 142. Advantageously, this demonstration enables the user to see in real time how changes to the visual properties of screen elements in a mobile application can be quickly implemented and deployed. An exemplary operation of communication system 100 will now be described with respect to FIG. 2.

FIG. 2 is a flow diagram that illustrates an operation of communication system 100 in an exemplary implementation. The operation 200 shown in FIG. 2 may also be referred to as demonstration process 200 herein. The steps of the operation are indicated below parenthetically. The following discussion of operation 200 will proceed with reference to servers 110 and 120 and computing system 140 of FIG. 1 in order to illustrate its operations, but note that the details provided in FIG. 1 are merely exemplary and not intended to limit the scope of process 200 to the specific implementation of FIG. 1.

Operation 200 may be employed by communication system 100 to facilitate demonstrating changes to mobile applications. As shown in the operational flow of FIG. 2, a computing system executes an instance of a virtual mobile device, wherein the virtual mobile device comprises at least one mobile application (201). In the example of communication system 100, hydra server 110 could execute the instance of a virtual mobile device 101. The computing system that executes the instance of the virtual mobile device typically comprises a mobile device emulator, such as an Android emulator, for example. The virtual mobile device comprises at least one mobile application. The mobile application on the virtual mobile device typically has a software development kit (SDK) installed into the application to facilitate implementing changes to visual elements appearing in the application. In at least one implementation, a graphical representation of the virtual mobile device is displayed on a remote computing system, such as computing system 140 in this example.

Instructions are received to change at least one visual element of the mobile application (202). The instructions to change the visual element could be received by many systems. For example, in some implementations, computing system 140 could receive the instructions to modify a visual element of a mobile application from a user via application editor 145 executing on computing system 140. However, in other examples, such as when computing system 140 does not include application editor 145 in browser 141, an administrator or some other user could provide the modification instructions using an application editor running on some other computing system. For example, a user may test out new application features or updates to the user interface of the application for viewing on JavaScript mobile device 142 within web browser 141, but the modification instructions would be provided by a separate, remote system. In any event, the visual element modification instructions could then received by application modification server 120. The modification instructions could also be received by virtual mobile device instance 101 and/or the mobile application executing on virtual mobile device 101, which would typically be transmitted by application modification server 120.

The instructions are processed to generate a screenshot of the change to the visual element of the mobile application (203). Typically, hydra server 110, which is running a mobile device emulator to instantiate virtual mobile device instance 101, would process the modification instructions with the mobile application running on virtual mobile device 101 to generate the screenshot of the change to one or more visual elements of the application. In some implementations, this may involve processing the instructions using the SDK installed in the mobile application to implement the changes to the screen elements, and then generating a screenshot of the resulting display with the modified visual elements. Any visual elements of a mobile application that appear on a display screen of a mobile device could be modified, including the color, copy, and position of text, buttons, and other objects, images, backgrounds, navigation items, list views, advanced layout configurations, and any other display properties of visual elements of an application.

The screenshot of the change to the one or more visual elements of the mobile application is transferred for delivery to a remote computing system, wherein the remote computing system displays the screenshot of the change (204). In the example of communication system 100, computing system 140 could represent the remote computing system that receives and displays the screenshot of the change to the visual elements. Typically, computing system 140 would display this screenshot as an update to the display screen of JavaScript mobile device 142 that is displayed within browser 141. In this manner, updates to visual elements of a mobile application can be presented to a user of the remote computing system, thereby demonstrating the ease and quickness that such changes can be implemented and deployed. A series of graphical user interfaces involving an application editor and a JavaScript mobile device executing on a computing system will now be described with respect to FIGS. 3A through 3E.

FIGS. 3A through 3E illustrate a series of graphical user interface (GUI) diagrams depicting an operation of computing system 300 in an exemplary embodiment. Computing system 300 provides an example of computing system 140 of communication system 100, but computing system 140 could use alternative configurations.

Figure 3A:
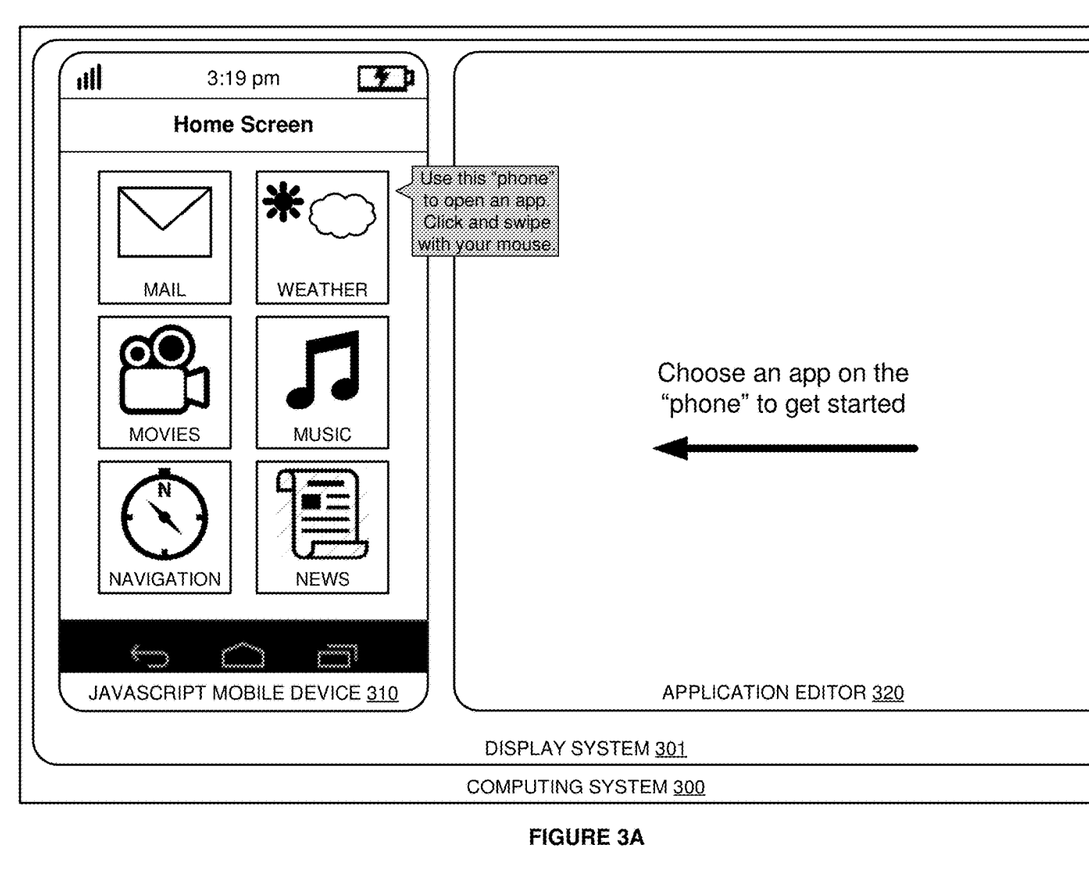
FIGS. 3A-3E are a series of graphical user interface (GUI) diagrams that illustrate an operation of a computing system in an exemplary embodiment.

Referring now to FIG. 3A, display system 301 of computing system 300 displays JavaScript mobile device 310 alongside application editor 320. JavaScript mobile device 310 and application editor 320 would typically be displayed in a web browser and are provided to demonstrate to a user how visual elements of a mobile application can be quickly and easily modified and updated. In FIG. 3A, JavaScript mobile device 310 displays a home screen of a mobile device. The home screen provides various mobile applications that have been installed on the device. In particular, the mobile applications shown on the home screen of JavaScript mobile device 310 include mail, weather, movies, music, navigation, and news applications. The user can select from among these applications to open an application for editing its visual elements. The application editor 320 instructs the user to choose an application to get started. In this example, the user selects the music application, the effect of which is shown in FIG. 3B.

Figure 3B:
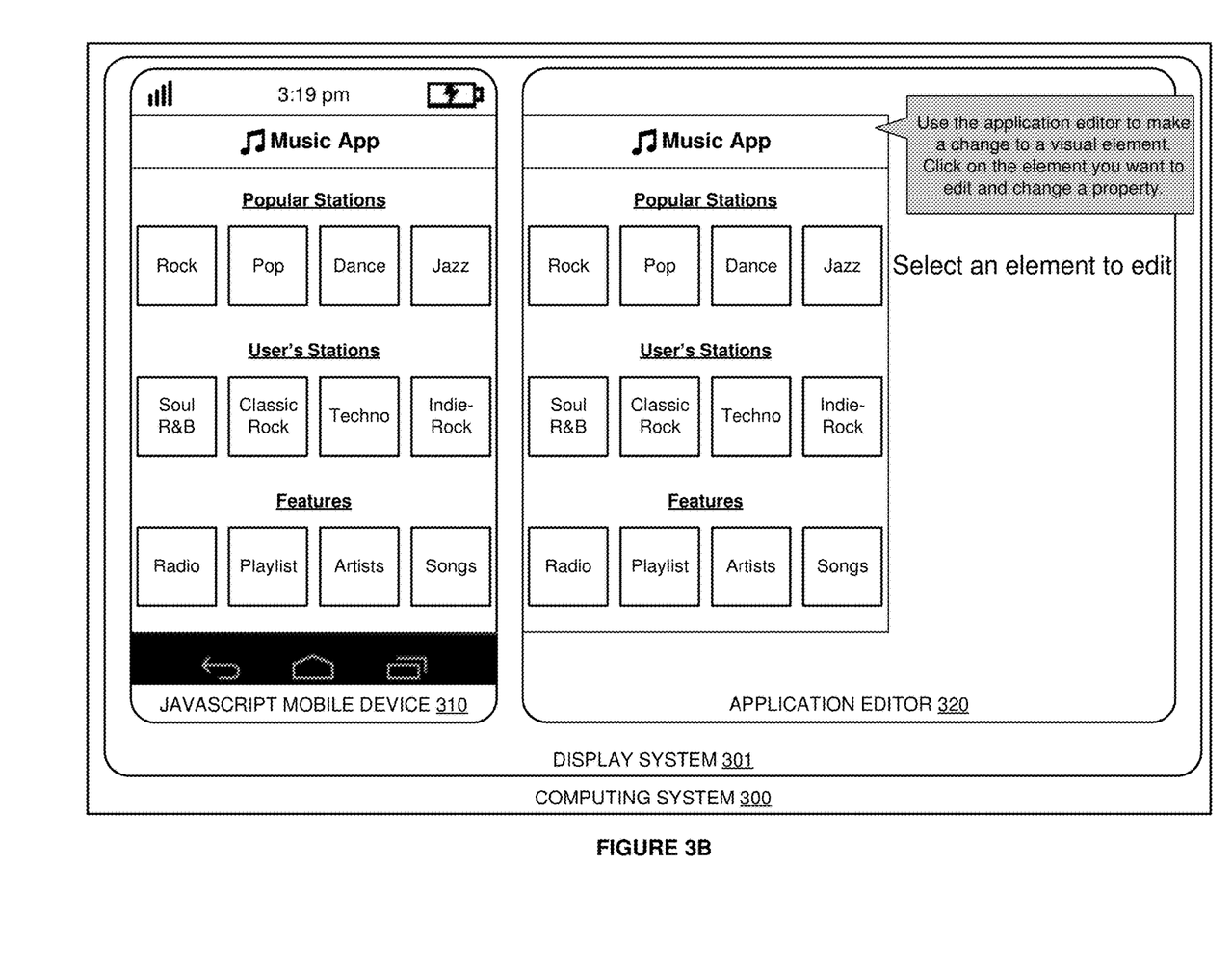

FIG. 3B illustrates the results of the user selecting the music application from the home screen of JavaScript mobile device 310. As shown in FIG. 3B, the music application is open and sets of icons for "Popular Stations", "User's Stations", and "Features" of the application are displayed on this screen of the music application. The visual elements of the music application are mirrored on the application editor window 320. Changes to the visual elements can be made using application editor 320. The user is directed to select a visual element for editing to change its display properties.

Figure 3C:
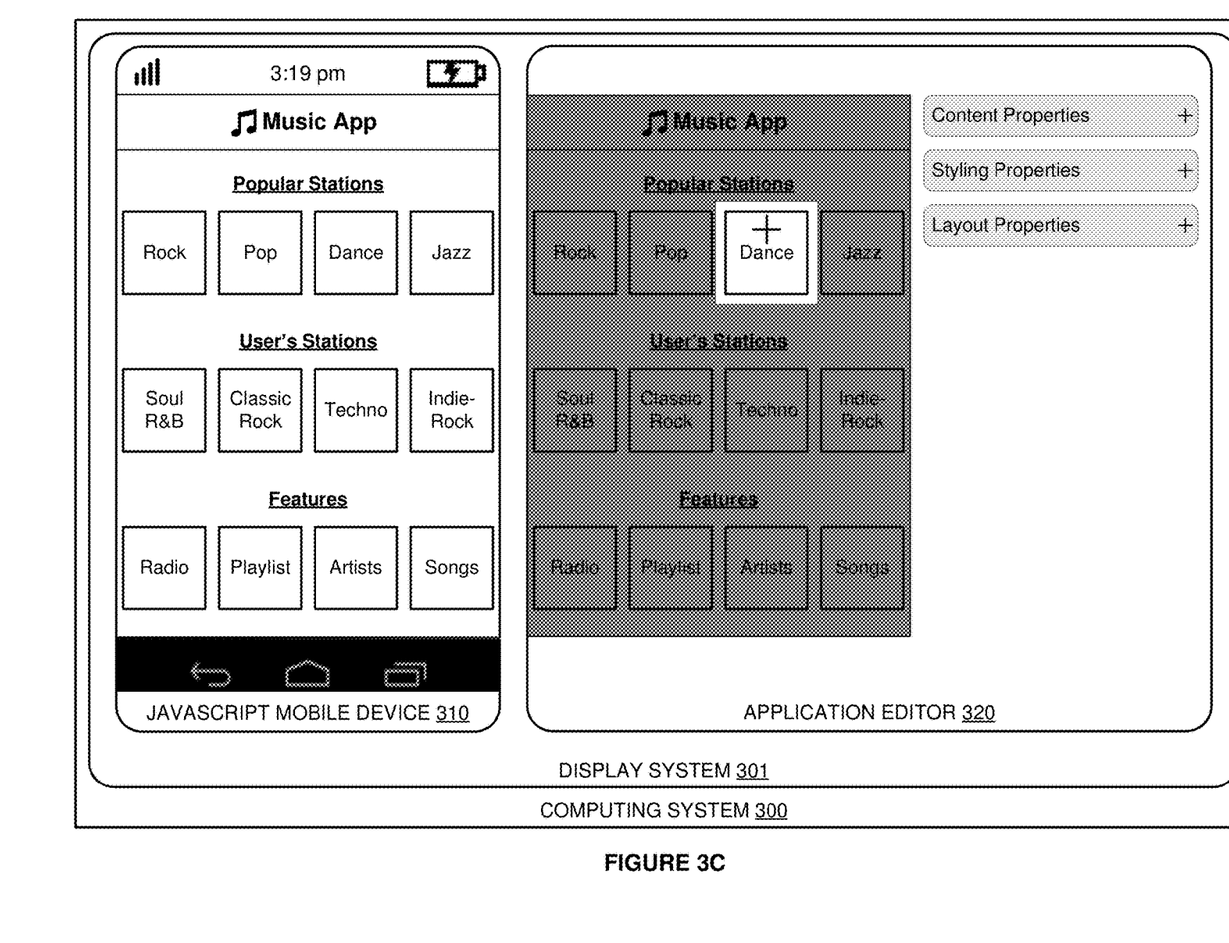

FIG. 3C illustrates the effect of the user selecting the "Dance" music station for editing, as shown by the box surrounding the "Dance" icon and the crosshair selection cursor appearing within the icon. The remaining visual elements of the music application are grayed out to indicate to the user that the "Dance" icon has been selected for editing. In this example, three different display properties are shown to the right of the application image on application editor 320, labeled "Content Properties", "Styling Properties", and "Layout Properties". The user can expand and contract these categories using the "plus" icon appearing to the right of each of the property boxes.

Figure 3D:
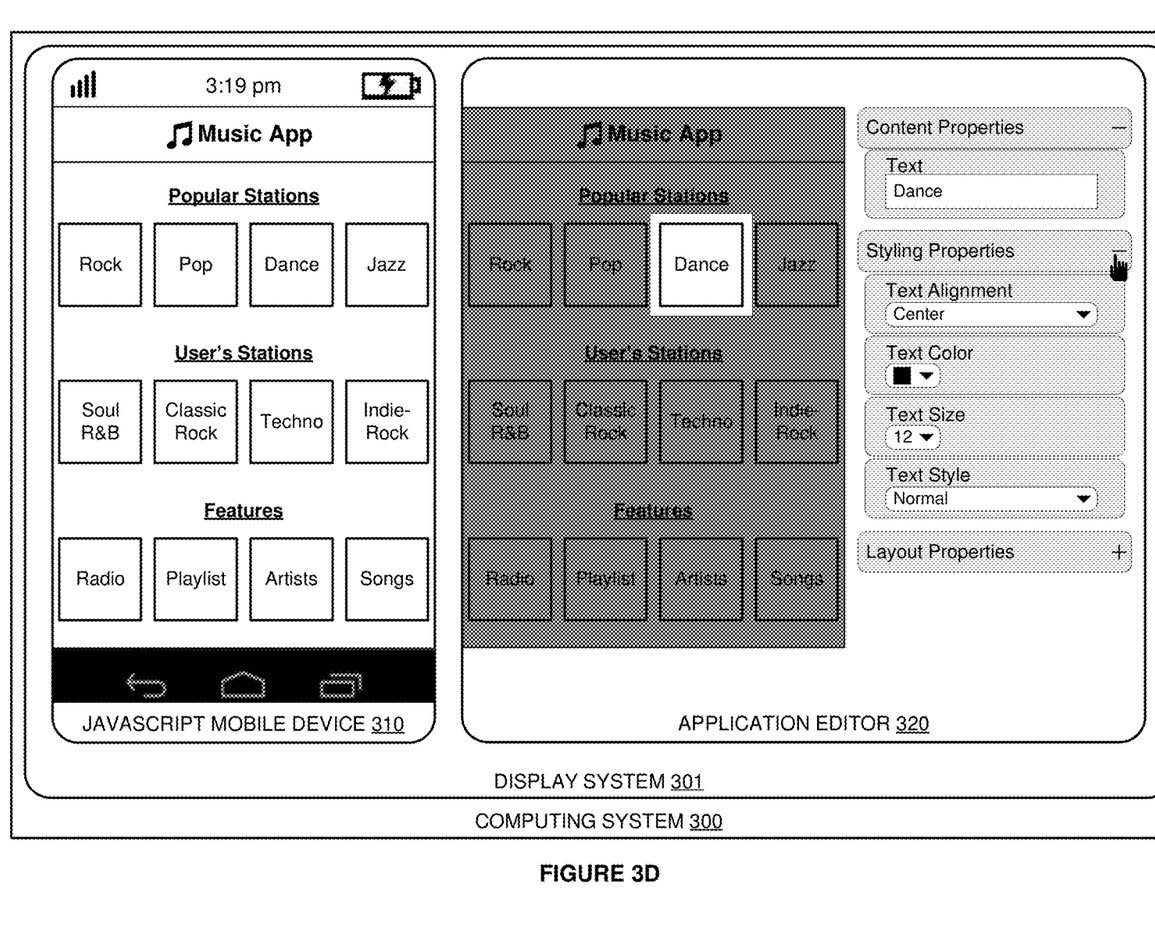

FIG. 3D illustrates the results of the user expanding the "Content Properties" and "Styling Properties" boxes. When expanded, the "plus" expansion icon becomes a "minus" icon, which will contract the menu options if selected. The small hand icon hovering over the "minus" icon of the "Styling Properties" dropdown menu indicates that the user has just expanded this menu. Under "Content Properties", the text of the "Dance" icon can be changed. Under "Styling Properties", the text alignment, text color, text size, and text style can be modified. For example, the user could change the text alignment from "Center" to left or right justification, change the text color from black to any other color using the dropdown color swatch, change the font size, and change the font style from "Normal" to bold, italic, or the like. The user does not make any changes to the "Dance" icon on FIG. 3D.

Figure 3E:
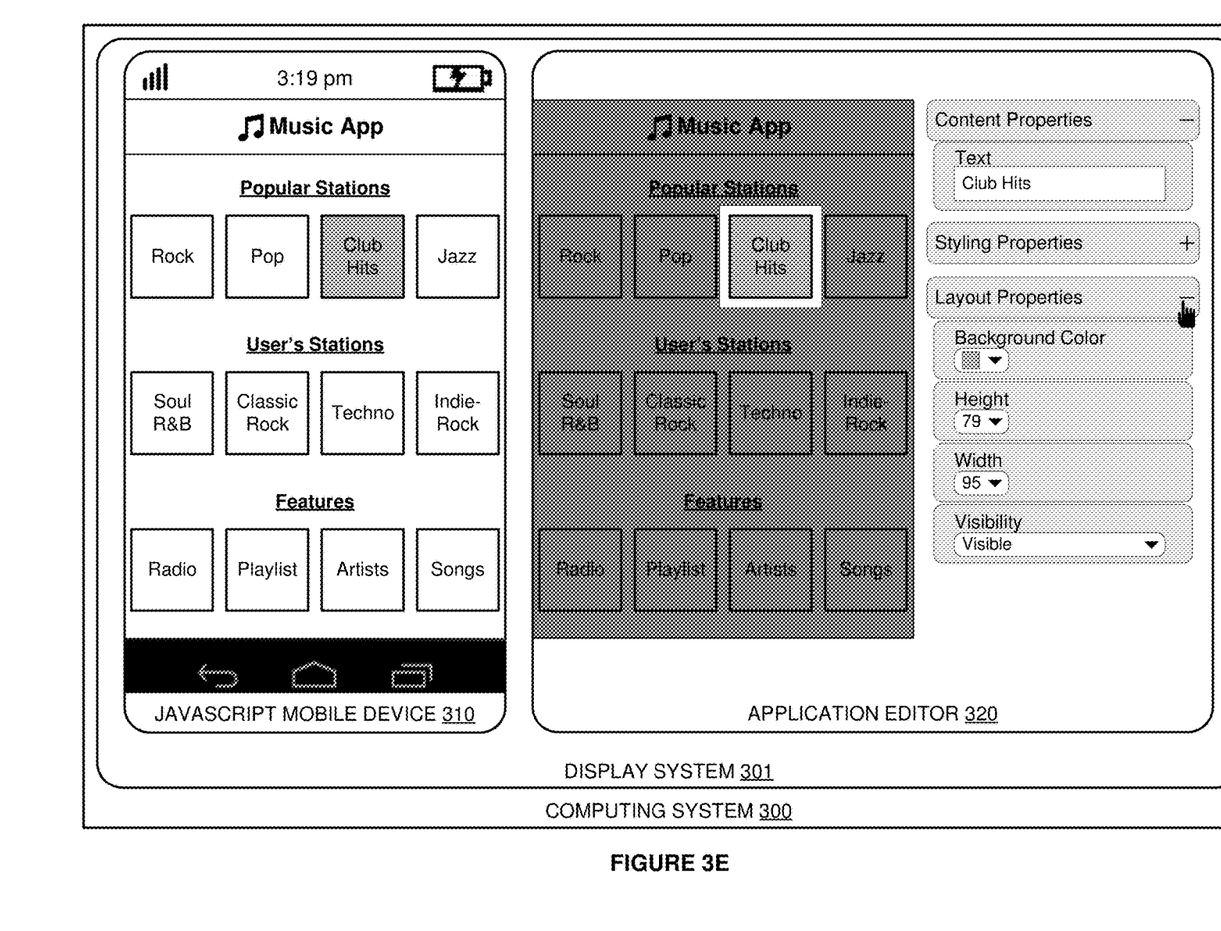

FIG. 3E illustrates the results of the user contracting the "Styling Properties" box and expanding the "Layout Properties" box. The "Layout Properties" menu includes options to change the background color of the icon, the height and width of the icon, and whether or not the icon is visible. In this example, the user has changed the content of the text of the icon from "Dance" to "Club Hits" under the "Content Properties" menu. In addition, the user has changed the background color of the icon from white to gray, so that the icon stands out among the others. These changes are shown in the application image in the application editor 320, and also immediately propagated and displayed on the JavaScript mobile device 310 to the left of the application editor window 320, as shown in FIG. 3E. In this manner, the user is able to rapidly make changes to visual properties of the mobile application and see the effects in near real time within a web browser, thereby demonstrating the value of this system to the user. A demonstration of simulated A/B testing results for the different variants before and after the changes made by the user in FIG. 3E will now be discussed with respect to FIG. 4.

FIG. 4 is a graphical user interface (GUI) diagram that illustrates an operation of computing system 400 in an exemplary embodiment. Computing system 400 includes display system 401 which displays exemplary A/B testing results for the two variants of the "Dance" music station icon before and after the modifications described in FIGS. 3A through 3E. The A/B testing results shown on display system 401 are simulated and used to demonstrate to the user how A/B testing of different variants of visual elements could be performed and presented to the user.

In this example, the top portion of display system 401 shows a first variant for the "Dance" music station icon before any modifications were made by the user. An image of how the icon appeared in the music application under the "Popular Stations" heading is shown to indicate the display properties of this variant to the user. Exemplary deployment and click rates are displayed graphically on the gauges appearing to the right of this variant. In this exemplary demonstration, the simulated values for this variant are shown as deployment to 85% of users, resulting in a click rate on the "Dance" icon of 39%.

In the lower portion of display system 401, a second variant for the changes made to the "Dance" icon by the user in FIG. 3E is shown. As discussed above with respect to FIG. 3E, the user changed the text content of the icon to "Club Hits" instead of "Dance", and changed the background of the icon to gray instead of white. These changes to the icon are shown to indicate the appearance of this variant to the user. Simulated A/B testing results are displayed to the right of this second variant, which indicate that the variant was deployed to 15% of users, but resulted in a click rate of 87%. Therefore, these simulated A/B testing results indicate that the changes made by the user to the "Dance" icon resulted in a much higher click rate for this station. Advantageously, this A/B testing demonstration allows the user to see the effects of the changes made to the icon as measured by user click rates, thereby enabling the user to understand and appreciate the value of application editor 320 and the A/B testing functionality.

Now referring back to FIG. 1, computing system 140 comprises a processing system and communication transceiver. Computing system 140 may also include other components such as a user interface, data storage system, and power supply. Computing system 140 may reside in a single device or may be distributed across multiple devices. Examples of computing system 140 include mobile computing devices, such as cell phones, tablet computers, laptop computers, notebook computers, and gaming devices, as well as any other type of mobile computing devices and any combination or variation thereof. Examples of computing system 140 also include desktop computers, server computers, and virtual machines, as well as any other type of computing system, variation, or combination thereof.

Communication network 130 could comprise multiple network elements such as routers, gateways, telecommunication switches, servers, processing systems, or other communication equipment and systems for providing communication and data services. In some examples, communication network 130 could comprise wireless communication nodes, telephony switches, Internet routers, network gateways, computer systems, communication links, or some other type of communication equipment, including combinations thereof. Communication network 130 may also comprise optical networks, packet networks, local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to several computer systems across a large geographic region.

Hydra server 110 may be representative of any computing apparatus, system, or systems that may connect to another computing system over a communication network. Hydra server 110 comprises a processing system and communication transceiver. Hydra server 110 may also include other components such as a router, server, data storage system, and power supply. Hydra server 110 may reside in a single device or may be distributed across multiple devices. Hydra server 110 may be a discrete system or may be integrated within other systems, including other systems within communication system 100. Some examples of hydra server 110 include desktop computers, server computers, cloud computing platforms, and virtual machines, as well as any other type of computing system, variation, or combination thereof.

Application modification server 120 may be representative of any computing apparatus, system, or systems that may connect to another computing system over a communication network. Application modification server 120 comprises a processing system and communication transceiver. Application modification server 120 may also include other components such as a router, server, data storage system, and power supply. Application modification server 120 may reside in a single device or may be distributed across multiple devices. Application modification server 120 may be a discrete system or may be integrated within other systems, including other systems within communication system 100. Some examples of application modification server 120 include desktop computers, server computers, cloud computing platforms, and virtual machines, as well as any other type of computing system, variation, or combination thereof.

Referring now to FIG. 5, a block diagram that illustrates computing system 500 in an exemplary implementation is shown. Computing system 500 provides an example of servers 110 and 120 and computing systems 140, 300, 400, or any computing system that may be used to execute demonstration process 200 or variations thereof, although such systems could use alternative configurations. Computing system 500 includes processing system 501, storage system 503, software 505, communication interface 507, and user interface 509. Software 505 includes application 506 which itself includes demonstration process 200. Demonstration process 200 may optionally be implemented separately from application 506.

Computing system 500 may be representative of any computing apparatus, system, or systems on which application 506 and demonstration process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for demonstration process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer readable media or storage media readable by processing system 501 and capable of storing software 505. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 509, processing system 501 loads and executes portions of software 505, such as demonstration process 200, to facilitate demonstrating changes to mobile applications. Software 505 may be implemented in program instructions and among other functions may, when executed by computing system 500 in general or processing system 501 in particular, direct computing system 500 or processing system 501 to execute an instance of a virtual mobile device on a computing system, wherein the virtual mobile device comprises at least one mobile application. Software 505 may further direct computing system 500 or processing system 501 to receive instructions to change at least one visual element of the at least one mobile application. Additionally, software 505 may direct computing system 500 or processing system 501 to process the instructions to generate a screenshot of the change to the at least one visual element. Finally, software 505 may direct computing system 500 or processing system 501 to transfer the screenshot of the change for delivery to a remote computing system, wherein the remote computing system displays the screenshot of the change.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate demonstrating changes to mobile applications as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-readable storage media are characterized as primary or secondary storage.

In some examples, if the computer-readable storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506 and/or demonstration process 200 (and variations thereof). However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 509. In some examples, user interface 509 could include a touch screen capable of displaying a graphical user interface that also accepts user inputs via touches on its surface. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate demonstrating changes to mobile applications, the method comprising:

responsive to a user operating a remote computing system to load an application editor and a software-based mobile device in a browser application, executing a mobile device emulator on a server computing system to instantiate a virtual mobile device for the software-based mobile device loaded in the browser application on the remote computing system, wherein the virtual mobile device comprises at least one mobile application having a software development kit (SDK) installed therein for handling modifications to visual elements of the at least one mobile application;

the virtual mobile device on the server computing system communicating with an application modification server to create a temporary user account on the application modification server for the virtual mobile device and receive a token comprising a unique key associated with the temporary user account transmitted from the application modification server;

the server computing system receiving instructions initiated by the application editor on the remote computing system to change at least one visual element of the at least one mobile application, wherein the application editor on the remote computing system transmits the instructions for delivery to the application modification server and the application modification server responsively transmits the instructions for delivery to the server computing system;

the server computing system processing the instructions with the virtual mobile device to generate a screenshot of the change to the at least one visual element; and the server computing system transferring the screenshot of the change for delivery to the remote computing system, wherein the remote computing system displays the screenshot of the change on the software-based mobile device loaded in the browser application.

2. The method of claim 1 wherein the virtual mobile device on the server computing system is implemented in JavaScript.

3. The method of claim 1 wherein the software development kit installed in the at least one mobile application analyzes the at least one mobile application to identify visual properties of the visual elements of the at least one mobile application.

4. The method of claim 1 wherein processing the instructions with the virtual mobile device to generate the screenshot of the change to the at least one visual element comprises processing the instructions using the software development kit installed in the at least one mobile application to implement the change to the at least one visual element and generating the screenshot of the change to the at least one visual element.

5. The method of claim 1 wherein receiving the instructions to change the at least one visual element of the at least one mobile application comprises receiving the instructions from the user via the application editor executing on the remote computing system.

6. The method of claim 1 wherein the remote computing system is configured to display a graphical representation of the virtual mobile device on the remote computing system.

7. The method of claim 6 wherein the remote computing system configured to display the graphical representation of the virtual mobile device on the remote computing system comprises the remote computing system configured to display the graphical representation of the virtual mobile device in the application editor executing on the remote computing system, and wherein receiving the instructions to change the at least one visual element of the at least one mobile application comprises receiving the instructions with respect to the graphical representation of the virtual mobile device displayed in the application editor executing on the remote computing system.

8. One or more computer-readable storage media having program instructions stored thereon to facilitate demonstrating changes to mobile applications, wherein the program instructions, when executed by a server computing system, direct the server computing system to at least:

responsive to a user operating a remote computing system to load an application editor and a software-based mobile device in a browser application, execute a mobile device emulator on the server computing system to instantiate a virtual mobile device for the software-based mobile device loaded in the browser application on the remote computing system, wherein the virtual mobile device comprises at least one mobile application having a software development kit (SDK)

installed therein for handling modifications to visual elements of the at least one mobile application:

communicate with an application modification server via the virtual mobile device on the server computing system to create a temporary user account on the application modification server for the virtual mobile device and receive a token comprising a unique key associated with the temporary user account transmitted from the application modification server:

receive instructions initiated by the application editor on the remote computing system to change at least one visual element of the at least one mobile application, wherein the application editor on the remote computing system transmits the instructions for delivery to the application modification server and the application modification server responsively transmits the instructions for delivery to the server computing system;

process the instructions with the virtual mobile device to generate a screenshot of the change to the at least one visual element; and transfer the screenshot of the change for delivery to the remote computing system, wherein the remote computing system displays the screenshot of the change on the software-based mobile device loaded in the browser application.

9. The one or more computer-readable storage media of claim 8 wherein the virtual mobile device on the server computing system is implemented in JavaScript.

10. The one or more computer-readable storage media of claim 8 wherein the software development kit installed in the at least one mobile application analyzes the at least one mobile application to identify visual properties of the visual elements of the at least one mobile application.

11. The one or more computer-readable storage media of claim 8 wherein the program instructions direct the server computing system to process the instructions with the virtual mobile device to generate the screenshot of the change to the at least one visual element by directing the server computing system to process the instructions using the software development kit installed in the at least one mobile application to implement the change to the at least one visual element and generate the screenshot of the change to the at least one visual element.

12. The one or more computer-readable storage media of claim 8 wherein the program instructions direct the server computing system to receive the instructions to change the at least one visual element of the at least one mobile application by directing the server computing system to receive the instructions from the user via the application editor executing on the remote computing system.

13. The one or more computer-readable storage media of claim 8 wherein the remote computing system is configured to display a graphical representation of the virtual mobile device on the remote computing system.

14. The one or more computer-readable storage media of claim 13 wherein the remote computing system configured to display the graphical representation of the virtual mobile device on the remote computing system comprises the remote computing system configured to display the graphical representation of the virtual mobile device in the application editor executing on the remote computing system, and wherein the program instructions direct the server computing system to receive the instructions to change the at least one visual element of the at least one mobile application by directing the server computing system to receive the instructions with respect to the graphical representation of the virtual mobile device displayed in the application editor executing on the remote computing system.

15. An apparatus comprising:
one or more computer-readable storage media; and
program instructions stored on the one or more computer-readable storage media that, when executed by a processing system of a server computing system, direct the processing system to at least:

responsive to a user operating a remote computing system to load an application editor and a software-based mobile device in a browser application, execute a mobile device emulator on the server computing system to instantiate a virtual mobile device for the software-based mobile device loaded in the browser application on the remote computing system, wherein the virtual mobile device comprises at least one mobile application having a software development kit (SDK) installed therein for handling modifications to visual elements of the at least one mobile application;

communicate with an application modification server via the virtual mobile device on the server computing system to create a temporary user account on the application modification server for the virtual mobile device and receive a token comprising a unique key associated with the temporary user account transmitted from the application modification server;

receive instructions initiated by the application editor on the remote computing system to change at least one visual element of the at least one mobile application, wherein the application editor on the remote computing system transmits the instructions for delivery to the application modification server and the application modification server responsively transmits the instructions for delivery to the server computing system;

process the instructions with the virtual mobile device to generate a screenshot of the change to the at least one visual element; and transfer the screenshot of the change for delivery to the remote computing system, wherein the remote computing system displays the screenshot of the change on the software-based mobile device loaded in the browser application.

16. The apparatus of claim 15 wherein the virtual mobile device is implemented in JavaScript.

17. The apparatus of claim 15 wherein the software development kit installed in the at least one mobile application analyzes the at least one mobile application to identify visual properties of the visual elements of the at least one mobile application.

18. The apparatus of claim 15 wherein the program instructions direct the processing system to process the instructions with the virtual mobile device to generate the screenshot of the change to the at least one visual element by directing the processing system to process the instructions using the software development kit installed in the at least one mobile application to implement the change to the at least one visual element and generate the screenshot of the change to the at least one visual element.

19. The apparatus of claim 15 wherein the program instructions direct the processing system to receive the instructions to change the at least one visual element of the at least one mobile application by directing the processing system to receive the instructions from the user via the application editor executing on the remote computing system.

20. The apparatus of claim 15 wherein the remote computing system is configured to display a graphical representation of the virtual mobile device on the remote computing system.

* * * * *